US012032525B2

(12) United States Patent
Emadzadeh et al.

(10) Patent No.: US 12,032,525 B2
(45) Date of Patent: *Jul. 9, 2024

(54) SYSTEMS AND COMPUTER IMPLEMENTED METHODS FOR SEMANTIC DATA COMPRESSION

(71) Applicant: Orbis Technologies, Inc., Annapolis, MD (US)

(72) Inventors: Mana Emadzadeh, Annapolis, MD (US); Steve Hamby, Hoschton, GA (US); Brian Ippolito, Annapolis, MD (US)

(73) Assignee: Contiem Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,233

(22) Filed: Apr. 1, 2022

(65) Prior Publication Data
US 2022/0229812 A1   Jul. 21, 2022

Related U.S. Application Data

(63) Continuation of application No. 16/731,317, filed on Dec. 31, 2019, now Pat. No. 11,301,425, which is a
(Continued)

(51) Int. Cl.
*G06F 16/174* (2019.01)
*H04L 65/40* (2022.01)
(Continued)

(52) U.S. Cl.
CPC ......... *G06F 16/1744* (2019.01); *H04L 65/40* (2013.01); *H04L 67/1014* (2013.01); *H04L 67/1021* (2013.01)

(58) Field of Classification Search
CPC ............... G06F 16/1744; G06F 16/174; G06F 17/30153; G06F 17/30; H04L 65/40;
(Continued)

(56) References Cited

U.S. PATENT DOCUMENTS 7,103,602 B2   9/2006   Black et al.
7,733,247 B1   6/2010   He et al.
(Continued)

OTHER PUBLICATIONS

Manning, C., et al., "An Introduction to Information Retrieval," Cambridge University Press (Online Edition© 2009), available at http://nlp.stanford.edu/IR-book/pdf/irbookprint.pdf, pp. 41-42.
(Continued)

*Primary Examiner* — Tonia L Dollinger
*Assistant Examiner* — Mehulkumar J Shah
(74) *Attorney, Agent, or Firm* — Jason M. Shapiro; Devlin Law Firm LLC (57) ABSTRACT

Computer implemented methods and systems directed to a technological improvement in electronic data compression and transmission between two computer systems using semantic analysis are disclosed. The method includes the step of compressing, at a first computer, a plurality of queued artifacts based on one or more network decision variables. The compression includes prioritizing the queued artifacts. The compression further includes determining a first set of artifacts in a set of queued artifacts to transmit and a second set of artifacts in a set of queued artifacts to only send links. The compression further includes replacing unnecessary content in the set of queued artifacts with one or more identifiers. The method further includes the step of transmitting, from the first computer, one or more batches of the compressed data over a network to a second computer.

22 Claims, 3 Drawing Sheets

Related U.S. Application Data continuation of application No. 14/551,929, filed on Nov. 24, 2014, now Pat. No. 10,545,918.

(60) Provisional application No. 61/907,578, filed on Nov. 22, 2013.

(51) Int. Cl.
*H04L 67/1014* (2022.01)
*H04L 67/1021* (2022.01)

(58) Field of Classification Search
CPC . H04L 67/1014; H04L 67/1021; H04L 29/08; H04L 67/06
See application file for complete search history.

(56) References Cited

U.S. PATENT DOCUMENTS

| | | | |
|---|---|---|---|
| 7,921,086 | B1 | 4/2011 | Bromley et al. |
| 7,992,037 | B2 | 8/2011 | Dubnicki et al. |
| 8,078,593 | B1 | 12/2011 | Ramarao |
| 8,219,524 | B2 | 7/2012 | Gokhale |
| 8,250,325 | B2 | 8/2012 | Holdman et al. |
| 8,510,275 | B2 | 8/2013 | Wilson et al. |
| 8,521,705 | B2 | 8/2013 | Jayaraman et al. |
| 8,620,842 | B1* | 12/2013 | Cormack .............. G06F 16/93 706/12 |
| 8,782,077 | B1 | 7/2014 | Rowley et al. |
| 2002/0169934 | A1 | 11/2002 | Krapp et al. |
| 2003/0105716 | A1 | 6/2003 | Sutton et al. |
| 2005/0004943 | A1* | 1/2005 | Chang .............. G06F 16/9535 |
| 2006/0015494 | A1 | 1/2006 | Keating et al. |
| 2006/0248053 | A1* | 11/2006 | Sanfilippo ............ G06F 16/355 |
| 2007/0055931 | A1 | 3/2007 | Zaima |
| 2007/0233707 | A1 | 10/2007 | Osmond et al. |
| 2007/0255758 | A1 | 11/2007 | Zheng et al. |
| 2008/0005141 | A1 | 1/2008 | Zheng et al. |
| 2008/0016131 | A1 | 1/2008 | Sandorfi et al. |
| 2008/0059451 | A1 | 3/2008 | Musgrove |
| 2008/0098083 | A1 | 4/2008 | Shergill et al. |
| 2008/0155192 | A1 | 6/2008 | Iitsuka |
| 2008/0294660 | A1 | 11/2008 | Patterson et al. |
| 2009/0049260 | A1 | 2/2009 | Upadhyayula |
| 2009/0089483 | A1 | 4/2009 | Tanaka et al. |
| 2009/0132619 | A1 | 5/2009 | Arakawa et al. |
| 2009/0204636 | A1 | 8/2009 | Li et al. |
| 2009/0234870 | A1 | 9/2009 | Bates et al. |
| 2009/0313248 | A1 | 12/2009 | Balachandran et al. |
| 2009/0327625 | A1 | 12/2009 | Jaquette et al. |
| 2010/0029497 | A1 | 2/2010 | Himmler et al. |
| 2010/0070448 | A1* | 3/2010 | Omoigui ............ H01L 27/1463 706/55 |
| 2010/0077013 | A1 | 3/2010 | Clements et al. |
| 2010/0088296 | A1 | 4/2010 | Periyagaram et al. |
| 2010/0094817 | A1 | 4/2010 | Ben-Shaul et al. |
| 2010/0125553 | A1 | 5/2010 | Huang et al. |
| 2010/0161608 | A1 | 6/2010 | Jain et al. |
| 2010/0250896 | A1 | 9/2010 | Matze |
| 2010/0299311 | A1 | 11/2010 | Anglin et al. |
| 2010/0313036 | A1 | 12/2010 | Lumb |
| 2010/0313040 | A1 | 12/2010 | Lumb |
| 2011/0010498 | A1 | 1/2011 | Lay et al. |
| 2011/0029497 | A1 | 2/2011 | Benhase et al. |
| 2011/0066628 | A1 | 3/2011 | Jayaraman |
| 2011/0071989 | A1 | 3/2011 | Wilson et al. |
| 2011/0093471 | A1 | 4/2011 | Brockway et al. |
| 2011/0099154 | A1 | 4/2011 | Maydew et al. |
| 2011/0145286 | A1 | 6/2011 | LaRowe |
| 2011/0246741 | A1 | 10/2011 | Raymond et al. |
| 2011/0258049 | A1* | 10/2011 | Ramer .............. G06Q 30/0273 705/14.69 |
| 2011/0264997 | A1* | 10/2011 | Mukerjee ............ G06F 16/3334 707/769 |
| 2011/0271232 | A1* | 11/2011 | Crochet ................ G06F 40/194 715/810 |
| 2012/0158672 | A1 | 6/2012 | Oltean et al. |
| 2013/0138659 | A1 | 5/2013 | Fang |
| 2013/0246430 | A1 | 9/2013 | Szucs et al. |
| 2014/0006357 | A1 | 1/2014 | Davis |
| 2014/0280183 | A1 | 9/2014 | Brown |
| 2015/0178569 | A1* | 6/2015 | Tiwari ................ G06F 16/5854 382/115 |
| 2017/0032205 | A1* | 2/2017 | Paul ...................... G06V 40/50 |

OTHER PUBLICATIONS

"Apache Storm," Apache Software Foundation, 2014, available at http://storm.apache.org/, pp. 1-2.

"Geohash," Wikipedia Entry, last modified Mar. 17, 2015, available at http://en.wikipedia.org/wiki/Geohash, pp. 1-7.

"Semantic Web," W3C, 2015, available at http://www.w3.org/standards/semanticweb/, pp. 1-7.

"WANem, The Wide Area Network Emulator," released 2008, available at http://wanem.sourceforge.neU, p. 1.

"What is KLV metadata," Motion Imagery Standards Board, Feb. 9, 2011, available at http://www.gwg.nga.mil/misb/faq.html#section3.2, pp. 1-11.

Dell Inc., "Achieving Storage Efficiency with Data Deduplication", Dell NX4, 2008, pp. 1-17.

Hewlett-Packard Development Company, L.P., "Integrating HP Data Protector Sollware with HP Data Deduplication Solutions", HP, 2008, pp. 1-10.

Meyer, D.T., et al., "A Study of Practical Deduplication," In FAST '11: Proceedings of the 9th Conference on File and Storage Technologies, Feb. 2011, pp. 1-13.

\* cited by examiner

SYSTEMS AND COMPUTER IMPLEMENTED METHODS FOR SEMANTIC DATA COMPRESSION

CROSS REFERENCE TO RELATED APPLICATIONS

The present application is a continuation of U.S. Non-Provisional Patent Application No. 16/731,317 entitled "Systems And Computer Implemented Methods For Semantic Data Compression," filed Dec. 31, 2019, which is a continuation of U.S. Non-Provisional Patent Application No. 14/551,929 entitled "Systems And Computer Implemented Methods For Semantic Data Compression," filed Nov. 24, 2014, and claims priority benefit under 35 U.S.C. § 119(e) of the U.S. Provisional Patent Application No. 61/907,578 entitled "Network Aware Semantic Data Compression," filed Nov. 22, 2013, the contents of all of which are incorporated herein by reference in their entirety.

TECHNICAL FIELD

The present invention relates to systems and methods to optimize the compression and transmission of data across computer systems.

BACKGROUND

A cloud system generally refers to a group of electronically networked computer servers that may provide centralized data storage and online access to services and resources, In some instances, an enterprise based system or network may be implemented as one or more cloud based systems. In some instances, the networked computer servers and databases and other hardware components in the cloud may be distributed geographically. A large enterprise may have a distributed cloud system with multiple cloud based systems situated at diverse locations. For example, where an enterprise spans nationally or internationally, the enterprise cloud system may be comprised of small clouds (small local infrastructures) as well as large cloud networks (e.g., global data centers). Such cloud based systems are typically electronically networked together over one or more communications networks, Distributed cloud based systems often need to share information across a variety of communication networks (satellite, Internet, etc.), for example, to transfer or synchronize data between the different systems. In some instances, only limited or fixed network bandwidth network infrastructures are available to transfer data between different resources within a cloud system or between cloud systems. Connectivity can also be unreliable or bandwidth can be inadequate to synchronize a large volume of enterprise data. In addition, remote disconnected computer infrastructures can be placed in remote locations where large volumes of data cannot be transferred reliably due to bandwidth limitations. Finally, the cost of transferring large amounts of data is not trivial and reducing the amount of data that must be transferred to keep clouds synchronized will be financially beneficial.

Some methods of data deduplication use comparison of bytes, strings, and arbitrary chunks of data to determine data deduplication. However, this approach fails to take into consideration the content of the artifact or the corpus of data where that artifact resides. An artifact may refer to a document, image, and any other data objects (e.g., shape files, maps, etc.). One data management technique includes source deduplication, which is the removal of redundancies from data before transmission to the backup target, Source deduplication products may reduce bandwidth and storage usage but increase the workload on the servers and processing elements. Source deduplication compares new blocks of data with previously stored data. If the server has the previously stored data, then the software does not send that data and instead notes that there is a copy of that block of data at that client. If a previous version of a file has already been backed up, the software will compare files and back up any parts of the file it hasn't seen. Source deduplication is well suited for backing up smaller remote backup sets.

A second approach is target deduplication, which is the removal of redundancies from a backup transmission as it passes through an appliance sitting between the source and the backup (e.g. intelligent disk targets (IDTs), virtual tape libraries (VTL)). Target deduplication reduces the amount of storage required at the target but does not reduce the amount of data that must be sent across a long area network (LAN) or wide area network (WAN).

Thus, there exists a need more efficiently compress and transmit information across disparate enterprise systems.

SUMMARY OF THE INVENTION

To overcome one or more of the problems described above, network aware semantic data compression and transmission systems and computer implemented methods are disclosed. These systems and computer implemented methods implement a cloud transfer service ("CTS") that semantically compresses artifacts and prioritizes the transmission of artifacts across disparate enterprise systems. In some embodiments, the CTS may be implemented where distributed clouds utilize advanced Hadoop based Natural Language Processing (NLP) algorithms to perform semantic analysis of the content contained in the artifacts. Additional Hadoop analytics may also be incorporated to identify corpus wide characteristics that can be used to compress the data. In exemplary embodiments, these techniques further reduce the artifact size during transfer, which is of particular importance when the network is constrained or unreliable, In one embodiment, a computer-implemented method is used for semantic data compression and transmission. The method includes the step of receiving, at a first computer, a query from a second computer to transmit a plurality of artifacts to the second computer over a network, The method further includes the step of queuing, at the first computer, a plurality of artifacts in response to the received query. The method further includes the step of compressing, at the first computer, the plurality of queued artifacts based on one or more network decision variables. The compressing includes the steps of: prioritizing, at the first computer, the queued artifacts; determining, at the first computer, a first set of artifacts in the set of queued artifacts to transmit and a second set of artifacts in the set of queued artifacts to only send links, wherein the set of queued artifacts comprises the first and second set of artifacts; and replacing, at the first computer, unnecessary content in the set of queued artifacts with one or more identifiers. The method further includes the step of calculating, at the first computer, an optimum batch size of the compressed queued artifacts. The method further includes the step of batching, at the first computer, the compressed queued artifacts into one or more batches based on the calculating. The method further includes the step of transmitting, by the first computer, the one or more batches over the network to the second computer.

In some embodiments, the network decision variables of the computer-implemented method are based on at least one of relationships between textual elements in an artifact and relationships between artifacts, The network decision variables may include one or more of: phrase index algorithm, cluster optimization, network analysis, geographic information system coordinate based tiling, geographic information system place name index, geographic information system shape file optimization, relationship driven optimization, automated National Imagery Transmission Format chipping, key length value video correlation, and query based machine learning optimization.

In some embodiments, a cloud transfer service system provides semantic data compression and transmission. The system includes a processor; a network interface coupled to the processor, wherein the network interface is communicatively coupled to a network; a data storage system; and a non-transitory memory coupled to the processor storing computer readable program instructions. The computer readable program constructions configure the processor to perform the step of receiving a query from a second computer over the network to transmit a plurality of artifacts to the second computer over the network. The processor is further configured to perform the step of queuing a plurality of artifacts in response to the received query. The processor is further configured to perform the step of compressing the plurality of queued artifacts based on one or more network decision variables. The compressing includes the steps of: prioritizing the queued artifacts; determining a first set of artifacts in the set of queued artifacts to transmit and a second set of artifacts in the set of queued artifacts to only send links, wherein the set of queued artifacts comprises the first and second set of artifacts; and replacing unnecessary content in the set of queued artifacts with one or more identifiers. The processor is further configured to perform the step of calculating an optimum batch size of the set of compressed queued artifacts. The processor is further configured to perform the step of batching the compressed queued artifacts into one or more batches based on the calculating. The processor is further configured to perform the step of transmitting the one or more batches over the network to the second computer through the network interface.

In some embodiments, the network decision variables of the cloud transfer service system are based on at least one of relationships between textual elements in an artifact and relationships between artifacts. The network decision variables may include one or more of: phrase index algorithm, cluster optimization, network analysis, geographic information system coordinate based tiling, geographic information system place name index, geographic information system shape file optimization, relationship driven optimization, automated National Imagery Transmission Format chipping, key length value video correlation, and query based machine learning optimization.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Systems and computer-implemented methods implementing a cloud transfer service ("CTS") that leverages semantic compression of artifacts are disclosed. In exemplary embodiments, the present invention may be implemented in an enterprise where distributed clouds utilize advanced Hadoop based Natural Language Processing (NLP) algorithms to perform semantic analysis of the content contained in the artifacts. Additional Hadoop analytics may further be incorporated to identify corpus wide characteristics that can be used to semantically compress the data.

The present invention is a technological improvement to the field of data compression and transmission. In exemplary embodiments, the present invention enables efficient transfer of data over a plurality of communication networks, particularly those with connectivity and/or transmission constraints such as thin pipelines, unreliable satellite links, etc. Technological benefits of the present invention may include a reduction of the artifact size during the packaging process and the ability to incorporate packet based compression techniques (e.g. Zip) to further reduce the artifact size during transfer.

The disclosed semantic data compression techniques further offer a technological improvement by enabling the prioritization and smart aggregation of corpus data such that only semantically related and correlated artifacts are transferred. The disclosed invention offers an improvement over state of the art data compression and transmission techniques because, for example, traditional approaches focus on the movement of individual artifacts void of the content itself, whereas the semantic compression approach takes into consideration the content and the corpus that it resides in for a more efficient packaging and transfer between two enterprise elements.

In exemplary embodiments, network analytics based upon artifact content may be used in order to optimize the storage, retrieval and transmission of data across the enterprise based on comparison of bytes and semantic facts. When documents are deconstructed, they contain a significant amount of redundant content (e.g. text [sentences, phrases] and facts derived from text). In exemplary embodiments, the present invention may be implemented as systems and computer-implemented methods that utilize a cloud transfer service that incorporates network analytical variables to prioritize transmission and reduce the size of the transmitted artifact based upon artifact content and network limitations.

In exemplary embodiments, the cloud transfer service may obtain semantically related documents. Several techniques used to correlate the information contained in the documents and to search the correlated documents semantically are disclosed in the following patents and pending patent applications, which are incorporated herein by reference in their entirety: Systems and Methods for Semantic Search, Content Correlation and Visualization, U.S. Pat. No. 8,725,771, Ser. Nos. 13/097,662, 13/097,746.

In exemplary embodiments, the cloud transfer service may leverage techniques used to query a large corpus of documents to retrieve contextually relevant search results. Such querying techniques are disclosed in the following pending patent application, which is incorporated herein by reference in its entirety: Systems and Methods for Three Term Semantic Search (CTA), U.S. patent application Ser. No. 13/071,949.

In exemplary embodiments, the cloud transfer service may leverage inferred additional semantic relationships between artifacts and/or pairs of entities. For example, the cloud transfer service may determine that, if Artifact A is related to Artifact B, it may infer that Document C is also related since it belongs to the same entity or shares a similar relationship. Such semantic inference techniques are disclosed in the following pending patent application, which is incorporated herein by reference in its entirety: Semantic Inference and Reasoning Engine (SIRE), U.S. application Ser. No. 13/422,962

Figure 1:
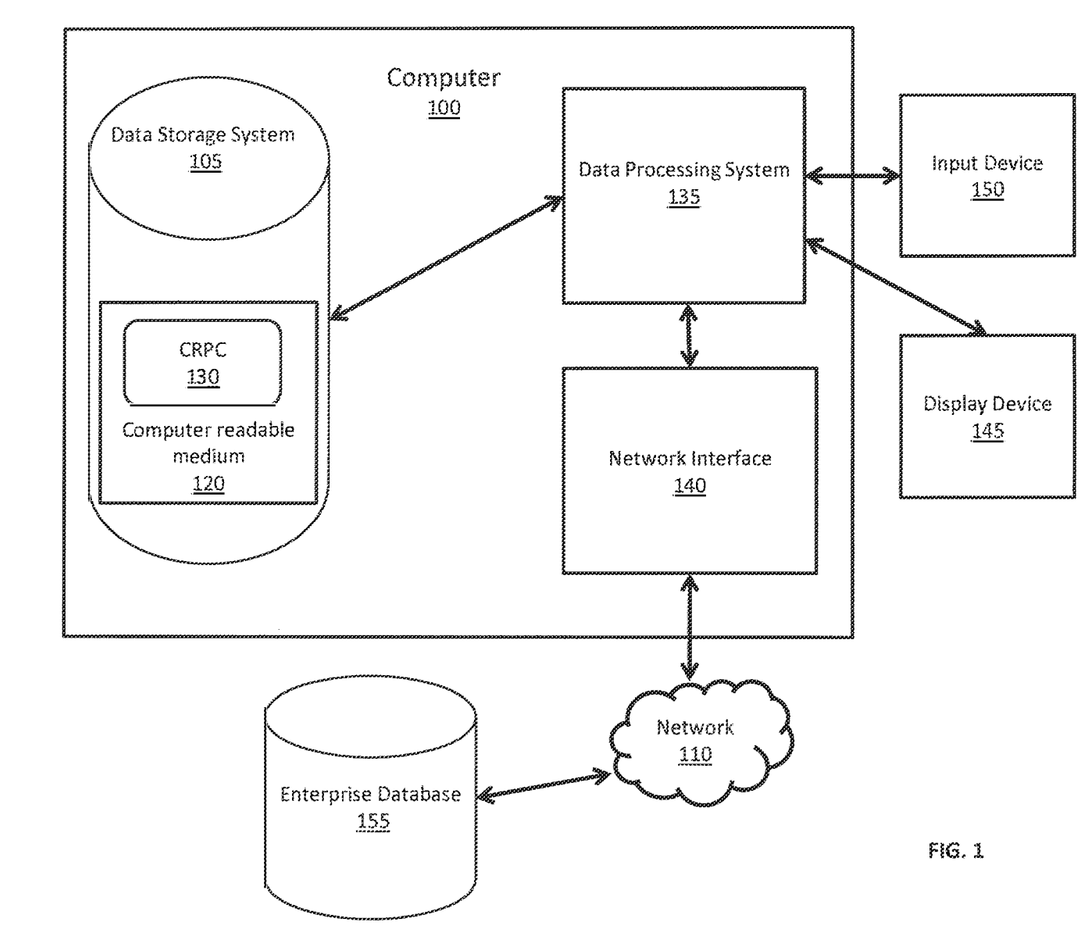
FIG. 1 is a schematic drawing showing a networked computer for implemented a cloud transfer service according to exemplary embodiments of the present invention.

FIG. 1 is a schematic drawing showing a networked computer for implementing a cloud transfer service according to exemplary embodiments of the present invention. As shown in FIG. 1, computer 100 may include a data processing system 135. In some embodiments, data processing system 135 may include any number of computer processors or central processing units (CPUs), any number of which may include one or more processing cores. In some embodiments, any of the processing cores may be physical or logical. For example, a single core may be used to implement multiple logical cores using symmetric multi-threading.

Computer 100 also includes network interface 140 for receiving messages (e.g., messages transmitted from a client) and transmitting messages over network 110, and a data storage system 105, which may include one or more computer-readable mediums. The computer-readable mediums may include any number of persistent storage devices (e.g., magnetic disk drives, solid state storage, etc.) and/or transient memory devices (e.g., Random Access Memory).

In some embodiments, computer 100 also may be connected to a display device 145. The display device 145 may be, for example, a monitor, touch screen, LCD screen, or any physical or virtual interface to display content. In some embodiments, a graphical user interface may be displayed on display device 145 to facilitate user interaction where the CTS is implemented on computer 100. The data processing system 135 of computer 100 may be connected to the display device 145, such as, for example, through a wireless or physical connection. In some embodiments, display device 145 is coupled to an input device 150, such as where computer 100 is connected to an LCD screen display device 145 configured to receive input from a user.

The data processing system 135 of computer 100 may also be connected to an input device 150, which may be, for example, a keyboard, touchscreen, mouse, or voice capture device for voice recognition. hi some embodiments, input device 150 may be connected to computer 100 via a network 110 and a network interface 140, and in other embodiments the input device 150 may be directly connected to the processing system 135 of computer 100, such as via a wire, cable, or wireless connection.

In embodiments where data processing system 135 includes a microprocessor, a computer program product implementing features of the present invention may be provided. Such a computer program product may include computer readable program code 130, which implements a computer program, stored on a non-transitory computer readable medium 120 that is part of data storage system 105. Computer readable medium 120 may include magnetic media (e.g., a hard disk), optical media (e.g., a DVD), memory devices (e.g., random access memory), etc. In some embodiments, computer readable program code 130 is configured such that, when executed by data processing system 135, code 130 causes the processing system to perform steps described below.

In other embodiments, computer 100 may be configured to perform the functions described below without the need for code 130. For example, data processing system 135 may consist merely of specialized hardware, such as one or more application-specific integrated circuits (ASICs). Hence, the features of the present invention described above may be implemented in hardware and/or software. For example, in some embodiments, the functional tiers described above may be implemented by data processing system 135 executing computer instructions 130, by data processing system 135 operating independent of any computer instructions 130, or by any suitable combination of hardware and/or software.

In exemplary embodiments, a cloud transfer service ("CTS") may be implemented on computer system 100, which includes a processor 135 and a non-transitory memory 120 storing computer readable program code 130. In some embodiments, the CTS system 100 may be integrated as part of an enterprise cloud based system. For example, an enterprise cloud based system may include a CTS system 100 node or network element configured to perform the semantic data compression and transmission processes described herein. In other embodiments, the CTS system 100 may be connected to an enterprise cloud based system over one or more communication networks 110 through network interface 140.

In exemplary embodiments, the CTS system 100 may be connected to a large scale enterprise database 155. In some embodiments, the database 155 may comprise multiple tables that represent a data index. In some embodiments, the database 155 may be SQL based, but it should be appreciated that the database is not limited to SQL and may be implemented using a variety of different database schemes and models. In exemplary embodiments, the CTS system 100 may be connected to a lame scale enterprise database 155 through, for example, a hardwired or wireless connection over a communications network 110. In some embodiments, the CTS system 100 may be connected to the large scale enterprise database 155 locally or remotely over a communications network 110.

The data index may include one or more of the following data elements: documents, text analytics metadata (sentence tokens, etc.), sentences, entities extracted from text, document relations, and end user asserted knowledge. In some embodiments, the large scale data index may include one or more correlated graphs represented as an ontology. In some embodiments, the large scale data index may include one or more of an integration ontology, a domain ontology, and a user ontology. For example, automatically correlated graphs are represented in the integration ontology. Semantic concept searches (e.g., "All technology companies associated with a particular location") may be stored in the domain ontology. Additionally, the data in the index may be packaged in accordance with the varying domains such that services support semantic concept searches.

In exemplary embodiments, the CTS system 100 may include one or more NLP algorithms to identify entities and relations found in text sources being transmitted via a network. In information and data modeling fields, an "entity" may be defined as a thing capable of an independent existence that can be uniquely identified. An entity is an abstraction from the complexities of a domain. Examples of identified entities may include a person, organization, location, event, equipment, etc. A "relation" captures the semantic connection between two entities. For example, the relationship "belongs" may connect a person entity to an organization entity (such as person A belongs to an organization B). NLP algorithms process the text found in artifacts to extract entities and their relationships.

In exemplary embodiments, the CTS system 100 takes advantage of Hadoop analytics and NLP processing that occurs when new data or an artifact is added to a cloud-based system, rather than at the time of transfer of artifacts to a second system. The CTS system 100 may utilize the UIMA framework and Stanford NLP pipeline to extract entities from the text and pass the values within different annotators and extracted relationships. Various domain specific models may be created for various entity types based on the UIMA framework and Stanford NLP pipeline libraries. In exemplary embodiments, the CTS system 100 has its own annotators to support extraction of certain types of entities such as, for example, MGRS coordinates, emails, hyperlinks, and phone numbers. Once all the extracted entities have been processed through the annotators, the CTS system 100 extracts the relationships between entities. In some embodiments, the CTS system 100 then extracts the relationships between the extracted entities using, for example, the Stanford tree parse.

In some embodiments, the CTS system 100 may include computer readable program code 130 including document clustering algorithms described in further detail below that correlate artifacts based upon duplicate document content at the sentence and phrase levels.

In some embodiments, the CTS system 100 may include computer readable program code 130 including algorithms that incorporate variables (e.g., priority ordering, network bandwidth and latency ratings) and domain specific algorithms that prioritize artifact-to-artifact correlations based upon the semantic analysis of the content and information hierarchies that take into consideration more time sensitive data and background information. Examples of these algorithms include the Phrase Index Algorithm (350), Cluster Optimization (352), Network Analysis (354), GIS Coordinate Tiling (356), GIS Place Name Index (358), GIS Shape file optimization (360), Relationship Drive Optimization (362), Automated NITF Chipping (364), Key Length Value Video Correlation (366), and Query based learning optimization (368), described in connection with FIG. 3 below. These algorithms may vary depending on the specific implementation. For example, one type of prioritization may include ranking a set of artifacts (to be transferred in response to a query) by the semantic relevance score assigned to each artifact. Relevance may be calculating using both how relevant this one artifact is to the search criteria as well as how unique the content of the artifact is across the entire document corpus. Another type of prioritization is to use the number of relationship connections between artifacts to determine which related documents should be prioritized higher than others.

In some embodiments, the CTS system 100 may implement data and workflow services to Implement decision variables to establish priorities on the flow of data between users at the various levels based upon the availability of the network bandwidth and user processes. For example, if network bandwidth is low and there are multiple requests from different users, the CTS system 100 will determine the optimum transmission sequence based on a combination of a given user's priority and the prioritization of the results done previously. If user A is set to a higher priority level than user B, and both have results to be transmitted, rather than sending all of user A's results and then sending all of user B's results, the system may send top two priority tiers of results from user A and then the top tier results from user B before sending lower priority tiers for user A, as an example.

Figure 2:
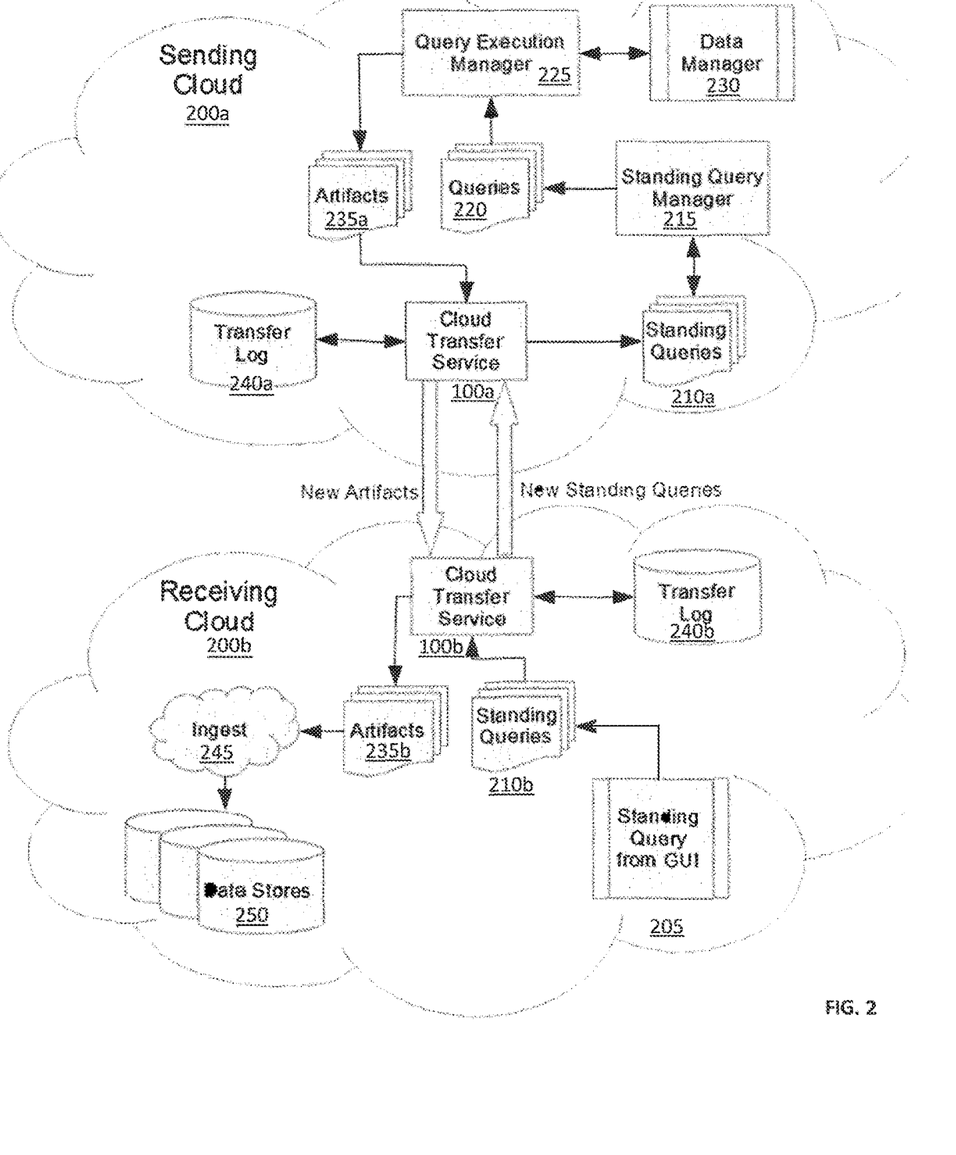
FIG. 2 is a schematic drawing showing the transfer of data between a sending cloud and receiving cloud implementing a cloud transfer service, according to exemplary embodiments of the present invention.

Referring now to FIG. 2, a schematic drawing showing the transfer of data between a sending cloud and receiving cloud implementing a cloud transfer service, according to exemplary embodiments of the present invention, is shown. In exemplary embodiments, sending cloud 200a and receiving cloud 200b are enterprise clouds hosted across one or more communications networks, In some embodiments, sending cloud 200a and receiving cloud 200b may be logically or physically/geographically separate clouds that are part of the same enterprise system. In other embodiments, sending cloud 200a and receiving cloud 200b may be logically or physically/geographically separate clouds that are part of two different enterprise systems. In exemplary embodiments, sending cloud 200a is hosting a cloud transfer service 100a and receiving cloud 200b is hosting a cloud transfer service 100b. Additionally, both CTS 100a and b may be connected to a communications network through a hardwired or wireless network link and network interface 140. In some embodiments, the CTS 100a,b may be implemented as software executing on a computer system 100 as shown in FIG. 1.

In exemplary embodiments, the receiving cloud 200b may transmit a standing query 210b to the sending cloud 200a for a set of artifacts that match the conditions in the standing query. A standing query 210a,b, or continuous query, refers to a query that is issued once over a database and logically runs continuously over the data until the query is terminated. Thus, a standing query 210a,b allows a client to get new results from an enterprise database without having to issue the same query repeatedly. However, in some embodiments, queries 210a,b may refer to traditional queries that run once to completion over a current dataset, such as a SPARQL query.

In some embodiments, a network element or node in receiving cloud 200b may receive a standing query 210a,b that is directed to data stored in sending cloud 200a. In some embodiments, the standing query 210a,b, may be composed by a user of cloud 200b. In other embodiments, the standing query 210a,b may be generated by an application running on receiving cloud 200b, for example, in response to user inputs received through a graphical user interface of that application. In FIG. 2, element 205 illustrates the receipt of a standing query from a GUI. Standing queries 210b issued from a GUI may then be transmitted to CTS 100b in the receiving cloud for processing.

In some embodiments, CTS 100a,b may store data in a transfer log 240a,b reflecting the status or other analytics associated with a data transfer request between receiving cloud 200b and sending cloud 200a. For example, the transfer logs 240a,b may record the date, time, and other analytics about the data transferred between the receiving cloud 200b and sending cloud 200a. Additionally, transfer log 240a,b may record instances where a user of receiving cloud 200b clicks on a link to a referenced artifact.

The CTS 100a in the sending cloud 200a may receive the standing queries 210a,b from CTS100b over a communications network 110, as described above. In some embodiments, the communications network 110 may be unreliable or may be subject to other transmission constraints, such as low bandwidth or congestion. In response to receiving a standing query 210a,b, the CTS 100a in sending cloud 200a may invoke a standing query manager 215 so that the query does not need to be re-transmitted between clouds 200b and 200a. The standing query manager 215 tracks the submitted standing queries from CTS 100b and periodically re-submits the exact same query in order to see if new data is available.

The standing query manager 215 may then issue one or more queries 220 to a query execution manager 225. The query execution manager 225 has two main functions. First, as shown in FIG. 2, the query execution manager 225 submits the query to data manager 230 in order to collect the results of those queries. Next, query execution manager 225 requests from data manager 230 the actual contents of the artifacts 235a responsive to the queries 220. The data manager 230 takes in queries and executes them against the various data sources available on cloud 200a and returns a set of results that match the submitted query. The data manager 230 also allows for the contents of he artifacts that correspond to the results to be extracted from various data sources.

The query execution manager 225 then transmits the contents of the artifacts 235a responsive to queries 220 to the CTS100a of sending cloud 200a. CTS100a will compress and batch the artifacts 235a, as described in further detail below, for transmission to the CTS 100b of receiving cloud 100b. Once the compressed artifacts are received by the CTS 100b, the CTS 100b of receiving cloud 200b will then transfer the compressed artifacts 235b to an ingest module 245 for insertion into one or more data stores 250.

The CTS 100b decompresses the contents received from CTS 100a by reversing the steps that CTS 100a used to compress the contents of those messages. The process is reversed completely with last step taken by CTS 100a being the first step taken by CTS 100b. This process continues until all compression techniques have been reversed and the full content of the artifacts are available to be ingested into various data stores 250.

Figure 3:
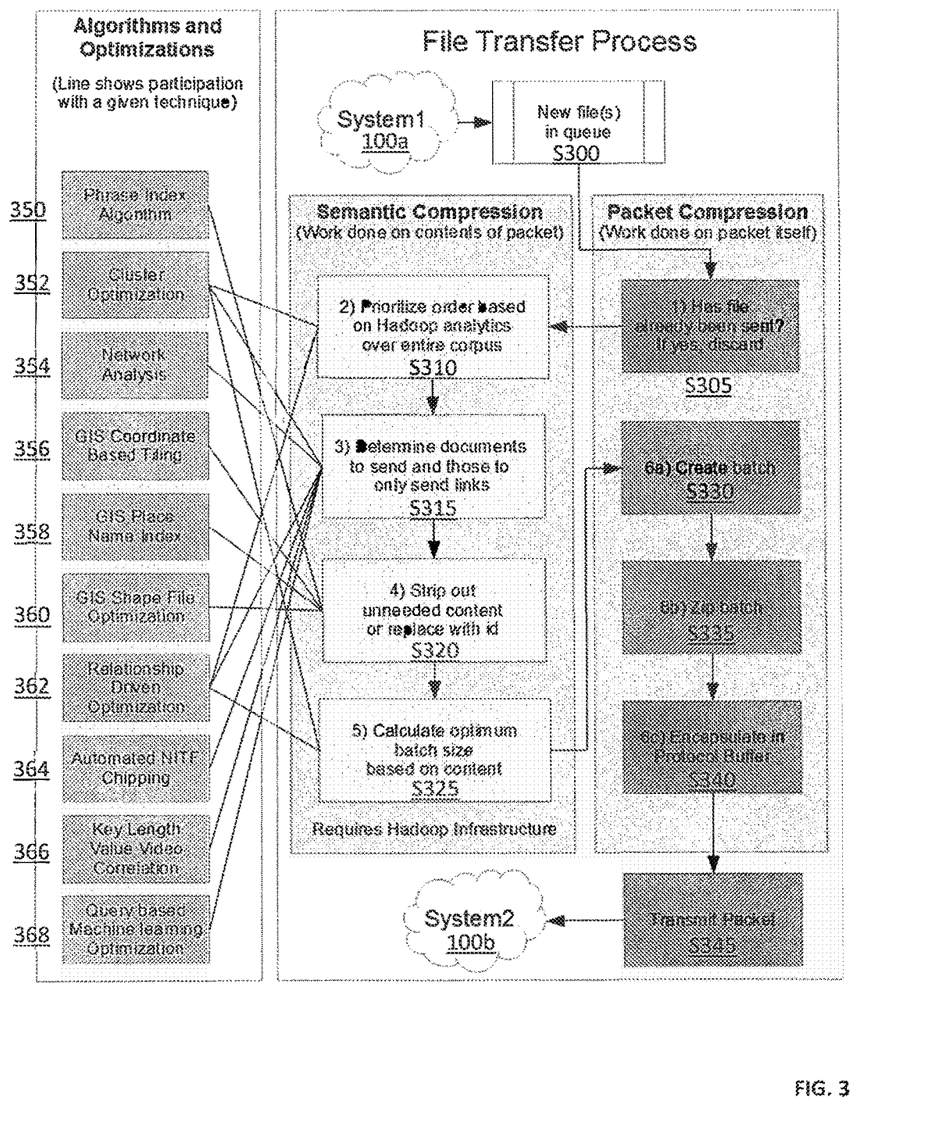
FIG. 3 is a flow diagram showing the transfer of data using packet and semantic compression, according to exemplary embodiments of the present invention.

FIG. 3 is a flow diagram showing the transfer of data using packer and semantic compression, according to exemplary embodiments of the present invention. Traditional compression techniques typically encompass compression of only the data packets themselves, irrespective of the content of those packets. In contrast, the semantic compression approach further compresses data for transmission based on the contents of those packets.

As shown in FIG. 3, CTS 100a of system 1 (e.g., sending cloud 200a) may place artifacts or files 235a into a queue in step S300 based on a received query. hi exemplary embodiments, the queue is maintained by CTS 100a, as shown in FIG. 2.

In step S305, the CTS100a performs an initial check to determine if the artifacts 235a in the queue have already been sent. The check may be based on the artifact's transfer log/history, which may be maintained in the transfer log database 240a. If an artifact has already been sent, that file is removed from the transmission package. If the artifact has not been sent, the artifact is processed for semantic compression.

In exemplary embodiments, system 1 (e.g., sending cloud 200a) and system 2 (e.g.. receiving cloud 200b) are Hadoop-based systems. In some embodiments, Hadoop machine learning algorithms perform entity and relationship extraction from unstructured text, structured data, and semi-structured data present on an enterprise cloud 100a, 100b. Key fusion entities such as time, location, etc. are derived based on explicit information and application domain specific lexicons.

In exemplary embodiments, the artifact data is stored in an index on a database system in cloud 100a,b along with every individual sentence. The analytics provide the source and location of the extracted entities, sentence and relationships from the artifacts. Additional analytics establish cross artifact similarity based upon the semantic analysis of the content. The indexing and extraction of data from artifacts in the cloud 100a, 100b serves as the foundational analytical element that creates the document cluster graphs from which decision variables will be applied against in order to establish transmission priority and described in step S310.

In step S310 of FIG. 3, the queued artifacts are prioritized based on Hadoop analytics over the entire corpus present in system 1 or sending cloud 100a. In exemplary embodiments, Hadoop analytics run on the entire document corpus in order to prioritize or order the transmission based on artifact relevance, relationships to other documents, originality, and other analytics that are available on the entire document system. For ease of reference, such analytics are referenced herein as "network analytics." In some embodiments, network analytics establish priority for highly cited and referenced artifacts that have entity relationship, related sentences, temporal, and/or geospatial relevance. Decision variables are integrated into the network services that are derived from anticipated network parameters (e.g. bandwidth). For example, documents may be prioritized based on the content of the document and its match to the issued query.

Relationship Driven Optimization 362: In some embodiments, a network analytic may take into consideration the relationships between artifacts. For example, as part of a relationship driven optimization algorithm, artifacts that have the most relationships with other artifacts may be prioritized over artifacts that have fewer relationships with other artifacts. This prioritization technique may incorporate social network analysis (SNA) and document cluster analysis products generated from both human and machine-generated users. This decision variable uses analysis of the strength of relationships in a graph resulting from either manual or machine-generated SNA, to prioritize the transmission packet content. While relationships are identified when data is added to the cloud-based system (and not during the transmission process itself), the same Hadoop analytics and NLP processing that were used in earlier examples are also used in this optimization. For example, if three artifacts are identified in the results of a query, artifacts A, B and C. If artifacts A and B have a strong relationship score with each other but weak scores with artifact C, then A and B will be sent in a batch before artifact C or artifact C will not be sent at all and just a link to artifact C will be sent. In exemplary embodiments, relationships between artifacts may be determined based on the relationships between the entities identified in each artifact. For example, Artifact A may include a report of suspicious activity by Entity E, Artifact B may include an email between Entity E and Entity F, and Artifact C may identify Entity F as part of an Organization. Thus, Artifacts A and B as well as B and C may be strongly related to each other, while there is a weaker relationship between Artifact A and Artifact C.

GIS Coordinate Based Tiling 356: In some embodiments, a geographic information system (GIS) coordinate based tiling network analytic may be used. In some embodiments, this analytic may integrate GeoHash techniques to generate all "local origins" represented by latitude/longitude intersects, and all other coordinates may be represented as an offset from that GeoHash. In addition to providing a reduction in network traffic, this analytic also creates an easy to use identifier for map locations. For example, if one cloud-based system primarily operates in a given geographic region, then a central point for that region can be established and, rather than sending full latitude and longitude values for every other point, just the offset from the central point would be sent. Geohash is an open industry standard algorithm that can reduce a latitude and longitude geo coordinates or address to a hash string. Incorporating Geohash for semantic compression reduces the need to transfer long text strings or long number of latitude and longitude without losing precision.

GIS Place Name Index 358: In some embodiments, one network analytic may include a geographic information system (GIS) place name index. This compression technique indexes common place-names, and replaces the text transmitted to edge nodes with an index. The GIS place name index is similar to the phrase index compression technique, described below, because it uses phrase indexing concepts. However, it is only for location entities. Additionally, the GIS place name index network analytic may aggregate existing location gazetteers into the place name index. For example, a common way of designating a specific geographic area is with a series of points, where the last point is the same as the first point in order to make up a polygon. If a given polygon is used multiple times, then replacing the entire sequence of points with a name or ID for that polygon will save traffic over the network.

GIS Shape File Optimization 360: In some embodiments, a geographic information system (GIS) Shape File Optimization network analytic may be used. The GIS Shape File Optimization analytic uses coordinate based tiling to align "common" shapefiles as well as vector objects into a single image. For each "local origin" GeoHash, one image containing aggregate of "common" shape files and the vector objects resulting from a search will be transmitted. The "common" shape files will be determined by analysis of existing log files and configuration of GIS products.

Prioritization is used in several of the optimizations described above. This process is key to determining not only the order to send the artifacts but also which to send in their entirety and which to send only as a link to the artifact. One prioritization example would be to rank the results by the semantic relevance score assigned to each result. Relevance is calculated using both how relevant this one document is to the search criteria as well as how unique the content of this document across the entire document corpus. Another example for prioritization is to use the number of relationship connections between documents to determine which related documents should be prioritized higher than others.

In exemplary embodiments, the CTS 100*a* in step S310 may prioritize documents according to the following steps:
Receive full results list from query
Combine scores returned for the applicable metrics within the results
Sort all results based on the combined scores In some embodiments, the combining may include an addition of scores or a weighted combination of scores. However, CTS 100*a* is not limited to such combination techniques and any other algorithm that is applicable to the specific implementation may be used. Additionally, the applicable metrics depend on the specific implementation, but may include any combination of, for example, the variables described above. For example, the applicable metrics may include the relevance score to an issued query or a relationship score from the relationship driven optimization 362 network analytic. In some embodiments, duster optimization 352 may use the above steps for S310 to contribute to the overall score for each artifact, Additionally, relationship driven optimization 362 may use steps S310 to contribute to the overall score for each artifact.

In step S315 of FIG. 3, the CTS 100*a* of system 1 determines which documents to send to the second system and which artifacts to only send links. In exemplary embodiments, the CTS system 100*a* uses network analytics to determine which of the queued artifacts need to be transmitted and determines related links to the original document. As shown in FIG. 3, step S315 may take into account duster optimization, network analysis, relationship driven optimization (described above), automated NITF Chipping, Key Length Value Video Correlation, and Query based machine learning optimization, but is not limited to using these network analytics.

Cluster Optimization 352: In some embodiments, artifacts may be prioritized based on a cluster optimization of the artifacts, hi some embodiments, Natural Language Processing Techniques (NLP) are used to establish cluster of related artifacts or documents that have calculated similarity scores (based upon similar statements, relationships, entities, etc.) between documents. Cluster optimization analyzes the cluster to determine document or artifacts to exclude from the network transmission. If the NLP extracted information does not add new information, this technique would choose to only send a link to the related document; in this case, with statements for which known facts it supports (i.e. this is provided for confidence and provenance reasons).

For example, cluster optimization 352 may encompass clustering all the related artifacts that belong a certain Person A (or Organization, Equipment Used or Location). A clustering of the artifacts may be quantified by the calculation of a similarity score. In exemplary embodiments, a similarity score between the artifacts will determine the strength of the relationship between the documents. Based on the similarity score being a numerically greater 'X' value, the CTS system 100*a* can determine if the entire linked artifacts' contents should be transmitted or if only a link to certain artifacts need to be sent. The user can click on the link, or utilize another interactive user-interlace element such as a button, if the user needs to retrieve the artifact. This mitigates the need to transmit the entire artifact, In some embodiments, individual artifacts and dusters are aligned with domain specific information hierarchies so that only the most critical source artifacts are passed and the duster pedigree is preserved. If needed, secondary artifacts are available for delivery across the network. By limiting the immediate automated orchestration to the most relevant or critical intelligence artifacts, the system can best utilize the available bandwidth.

In some embodiments, individual artifacts and dusters are aligned with domain specific information hierarchies so that only the most critical source artifacts are passed and the cluster pedigree is preserved. If needed, secondary artifacts are available for delivery across the network, By limiting the immediate automated orchestration to the most relevant or critical intelligence artifacts, the system can best utilize the available bandwidth.

Network Analysis 354: In some embodiments, step S315 may incorporate a network analysis analytic. Network analysis refers to a semantic compression technique that determines whether to provide a hyperlink, the actual artifact of a work product, the original source, or some subset of a work product or original source, based on the network bandwidth, latency, nature of the business deliverable and/or size of the artifact. For example, if an artifact is derived from a large source artifact, the semantic compression analytics may only send a link to the original source.

For example, if the speed of the network availability is greater than a certain percentage, then the full artifact content is sent. However, as the network quality degrades linearly, a determination is made if the related artifacts need to be transmitted or not based on the combination of network connection and size of the artifacts. In exemplary embodiments, network analysis 354 may include the following steps:
  Detect the quality of network connection;
  Estimate the size of the artifact;
  If the network connection quality is below a certain threshold, check the size of the artifact
  If the artifact size is above a certain threshold level, determine to send only the work product related content.
  Determine the sending of related content (such as an image, related attachment to the document) as a link to the related to content.

Automated NITF Chipping 364: In some embodiments, automated image chipping network analytic may be used. NITF (National Imagery Transmission Format) is a standard data format for digital imagery and encompasses a suite of standards for the exchange, storage, and transmission of digital imagery products and image related products. This analytic may automatically "chip" a large image based upon search queries. Chipping is the process of sending only a small segment of the image that may be of particular interest rather than sending the entire image.

Key Length Value Video Correlation 366: In some embodiments, a key length value video correlation network analytic may be used. This analytic leverages key:length: value (KLV) metadata to find video content within a video file based on the temporal and spatial filters of a search. The KLV metadata will determine frames within a large video file that are relevant to a query.

Query Based Machine Learning Optimization 368: In some embodiments, step S315 may incorporate query based machine learning optimization of network analytics, This technique uses machine learning over audit logs that monitor user query and resulting behavior to prioritize transmission of data. For example, if an existing network analytic causes the CTS to sends a link to a data source, and users are following that link 80% of the time, the machine learning optimization technique would highlight this so that the CTS would provide the referenced artifact directly and not just a hyperlink. Likewise, if the source artifact is being transmitted and resulting products from the user's analysis does not contain the source artifact's key information, the CTS could send a link instead.

For example, if Artifact A and Artifact B are both in the result set, but artifact A was prioritized high and artifact B was prioritized low, then the entire content of artifact A would be transmitted whereas just an ID that is enough to uniquely identify Artifact B is transmitted along with a small amount of information that shows why this artifact matched the query criteria. If interested, the user can select the link to artifact B and request that it be transmitted in its entirety via another query.

In exemplary embodiments, the CTS 100a in step S315 may determine to send links to artifacts and/or portions of artifacts according to the following steps:
  Obtain sorted list of results score from step S310;
  Determine threshold for sending full artifact;
  For each artifact above the threshold:
    Retrieve full content and store for transmission;
  For each artifact below the threshold:
  Store QueryID, ArtifactID, and snippet of text showing why the artifact is relevant to the query;
  Transmit just the QueryID, ArtifactID, and snippet to CTS 100b and not the full artifact.

In some embodiments, the threshold may include a preset value (i.e., send top 50%), and in other embodiments, a variable threshold may be calculated based on the results and specific implementation. In exemplary embodiments, several network analytics may incorporate the steps described above for step S315. For example, duster optimization 352 may use steps S315 by contributing to the overall score for each artifact. Network analysis 354 may use steps S315 by helping to determine the proper cut-off for which artifacts to send full content and which artifacts to send only links. Relationship driven optimization 362 may use steps S315 by contributing to the overall score for each artifact. Automated NITF chipping 364 may use steps S315 by only sending portions of the image that are relevant. Key length value video correlation 366 may use steps S315 by only sending portions of the video that are relevant. Query based machine learning optimization 368 may also use steps S315 to help determine the proper cut-off for what artifacts to send full content and what artifacts to send only links.

In step S320 of FIG. 3, unnecessary content is stripped out or replaced with an ID. For example, in exemplary embodiments, content may be stripped out or replaced with a much smaller ID based on the frequency of content across the entire document corpus. if the content is repeated across all documents than this replacement can be made across the entire corpus of the documents. Similarly, a determination may be made to de-duplicate or remove redundant and unnecessary information. Traditional approaches to compression only includes the document set that is being compressed rather doing the analysis across the entire corpus. In exemplary embodiments, step S320 of FIG. 3 may incorporate GIS Coordinate Based Tiling, GIS Place Name Index, GIS Shape File Optimization, described above, as well as a Phrase Index Algorithm, but is not limited to these network analytics.

Phrase Index Algorithm 350: In exemplary embodiments, duplicate content across the different artifacts in an enterprise cloud are detected and managed in a phrase index. Unstructured text in a large corpus may contain duplicative sentences or other phrases (paragraphs, headers, etc.) resulting from text that has knowingly or unknowingly been plagiarized. In exemplary embodiments, the duplicative content (e.g., sentences or other phrases phrases) is stored in a data index on a database system of the enterprise cloud. The duplicative text may be hashed according to techniques known in the art, and then indexed in a phrase index in a database system by a hash value and sentence/phrase key-value pair. In exemplary embodiments, the phrase index leverages positional index concepts, where each term and its offsets within the document are captured, such that the most common phrases can be calculated. As packets containing these phrases are assembled for transmission, the phrase would be replaced with an index id, such as '[PI:345]', and then replaced on the edge node when received. In some embodiments, textual duplication may be determined based on an exact match between the indexed phrase (such as a sentence) and the content present in an artifact. However, a variety of other duplication detection techniques and algorithms may be used to determine content matches.

In exemplary embodiments, the CTS 100*a* in step S320 may determine to strip out content and/or replace content with an identifier or hash according to the following steps:
Run content through NLP sentence detection and/or geo-detection (finding places, coordinates);
For each extracted item (sentence, coordinates, etc.):
  Check length:
    if less than hash length, ignore;
  Check if item has already been hashed in the content transfer log 240*a*:
    If yes, then replace sentence with hash;
    If no, create hash, add to content transfer log 240*a*, but leave sentence intact.

In exemplary embodiments, for decompression related to step S320, the CTS 100*b* in receiving cloud 200*b* may perform the following steps:
Run content through NLP sentence detection;
For each sentence:
  Check length:
    If less than hash length, ignore;
  Check if item is a hash in the content transfer log 240*b*:
    If yes, then replace hash with item in content transfer log 240*b* corresponding to that hash;
    If no, then create hash and add hash to the content transfer log 240*b*.

Several network analytics may incorporate the steps described above for step S320. For example, Phrase Index 350 may use steps S320 by replacing common sentences with sentence IDs. GIS Coordinate Based Tiling 356 may use steps S320 by replacing coordinates with GeoHash IDs. GIS Place Name Index 358 may use steps S320 by replacing place names with IDs. GIS Shape File Optimization 360 may use steps S320 by replacing GIS shapes with Ids. Automated NITF chipping 364 may use steps S320 by only sending portions of the image that are relevant. Additionally, Key Length Value Video Correlation 366 may use steps S320 by only sending portions of the video that are relevant.

In step S325, an optimum batch size is calculated based on the content of the packets, and in step S330 of FIG. 3, the CTS 100*a* will create a batch of the semantically compressed packets to send to system 2 or receiving cloud 100*b*.

In some embodiments, the CTS 100*a* of system 1 may use the Phrase Index Algorithm and Relationship Driven Optimization network analytics to calculate optimum batch size. The batch sizes are dynamically determined so as to optimize transmission of the most useful and most important documents first. The documents are batched based on semantic relevance and importance of the documents in contrast batching based on a fixed size. This grouping of files into relevant and most important document batches utilizes analytics that are performed over the entire document set. Also, the batch size is dynamic so that documents of similar importance are sent together and before those of lesser importance.

In exemplary embodiments, the CTS 100*a* in step S325 may calculate an optimum batch size according to the following steps:
Obtain sorted lists of results and scores from S310;
Process scores into a set of <index,value> pairs, wherein index is 1 for the first entry with the highest score, 2 for the next highest score, and so forth;
Run the resulting matrix of results through a mathematical algorithm to determine the optimum cut-off points;
Assign batches based on the results of the mathematical algorithm.

The mathematical algorithm may include, for example, calculating the second derivative of the results matrix and identifying the points where that second derivative transitions from negative to positive, thus identifying the minimum points of the first derivative, The minimum points correspond to the points of greatest decrease within the results matrix, Additionally, the batches may be based on the set of results with similar, high scores. When those scores begin to drop, then the next batch would be formed and results would be added until the results begin to drop again. In exemplary embodiments, several network analytics may use the steps described above for S325, For example, cluster optimization 352 and/or relationship driven optimization 362 may use steps S325 by contributing to the overall score for each artifact.

After the contents of the files inside the package have been optimized and packaged, the CTS 100*a* may achieve further compression through traditional compression and using techniques such as protocol buffer encapsulation before transmission to the target system or cloud.

In step S335 of FIG. 3, the batched packets may be further compressed using Zip or other conventional packet compression techniques. In step S340, the zipped batch may be encapsulated in a protocol buffer, according to techniques known in the art, and then transmitted in step S345 to system 2 or receiving cloud 100*b*.

In exemplary embodiments, a CTS100*b* of receiving cloud 100*b* receives the semantically compressed packets, decompresses them, and stores the data in one or more data stores. The CTS 100*b* decompresses the messages received from CTS 100*a* by reversing the steps that CTS 100*a* used to compress the contents of those messages. The process is reversed completely with last step taken by CTS 100*a* being the first step taken by CTS 100*b*. This process continues until all compression techniques have been reversed and the full content of the artifacts are available to be ingested into various data stores 250.

Workflow tools can be integrated into this process to assist in the automation and orchestration of the data transmission. The network analytics incorporate new knowledge created by end users (e.g. previous searches, internal work products, etc.) with machine-automated correlation and cross artifact correlation analytics. These analytics create correlated and fused clusters of artifacts and sources, and expose the assembled knowledge products to the end user. Network aware parameters based upon transmission method (e.g. satellite, radio, fixed, etc.) are taken into consideration in order to select the appropriate collection of variables. For example, if a user query indicates that artifacts belong to a certain organization, the program makes a correlation and transmits only artifacts based on this organization or related to certain entities (e.g., location, events).

While various embodiments and implementations of the present invention have been described above and claimed, it should be understood that they have been presented by way of example only, and not limitation. Thus, the breadth and scope of the present invention should not be limited by any of the above-described exemplary embodiments.

The invention claimed is:
1. A computer-implemented method for semantic compression and transmission of data, comprising:
receiving, at a first computer, a query from a second computer to transmit a plurality of artifacts to the second computer over a network, wherein the plurality of artifacts are from a corpus of documents;

queuing, at the first computer, the plurality of artifacts in response to the received query;
compressing, at the first computer, the plurality of queued artifacts, wherein compressing the plurality of queued artifacts comprises:
determining, at the first computer, for each of the plurality of queued artifacts, to send one of: an artifact, and only a link to the artifact based on semantic relatedness of queued artifacts to other queued artifacts, the determining resulting in a first set of artifacts to send, and a second set of artifacts to only send links;
wherein determining includes:
clustering the queued artifacts based on semantic similarity;
determining, for each cluster, a threshold based on respective semantic similarity scores of the artifacts;
assigning all artifacts in the cluster scoring above the threshold to the first set of artifacts;
transmitting, by the first computer, the first set of artifacts and links to the second set of artifacts over the network to the second computer.

2. The computer-implemented method of claim 1, wherein the one or more network decision variables include one or more of: phrase index algorithm, cluster optimization, network analysis, geographic information system coordinate based tiling, geographic information system place name index, geographic information system shape file optimization, relationship driven optimization, automated National Image Transmission Format chipping, key length value video correlation, and query based machine learning optimization.

3. The computer-implemented method of claim 1, wherein the one or more network decision variables are based on one or more of: relationships between textual elements in an artifact, and relationships between artifacts.

4. The computer-implemented method of claim 1, wherein the relationships comprise semantic connections between two entities.

5. The computer-implemented method of claim 1, further comprising:
ranking the queued artifacts by a semantic similarity score, wherein the semantic similarity score determines a strength of a relationship between artifacts; and
prioritizing transmission based on the semantic similarity score.

6. The computer-implemented method of claim 1, wherein sending further comprises:
identifying an artifact of the plurality of artifacts that comprises an image; and
sending a segment of the image determined to be of relevance to the query.

7. The computer-implemented method of claim 1, wherein sending further comprises:
identifying an artifact that comprises a video image; and
sending one or more frames of the video image determined to be of relevance to the query.

8. The computer-implemented method of claim 1, wherein sending further comprises:
monitoring the hyperlink by a machine learning system to determine whether users open the hyperlink to the artifact; and
when the hyperlink is opened by a majority of the users to access the artifact, replacing the hyperlink with the artifact in a subsequent transmission.

9. The computer-implemented method of claim 8, wherein a user requests transmission of the corresponding artifact for the hyperlink in a subsequent transmission.

10. The computer-implemented method of claim 1, wherein the link comprises a hyperlink.

11. The computer-implemented method of claim 1, wherein each link is sent with a statement for which known fact the artifact supports.

12. A cloud transfer service system for semantic data compression and transmission, comprising:
a processor;
a network interface coupled to the processor, wherein the network interface is communicatively coupled to a network;
a data storage system; and
a non-transitory memory coupled to the processor storing computer readable program instructions, wherein the computer readable program constructions configure the processor to perform the steps of:
receiving, at a first computer, a query from a second computer to transmit a plurality of artifacts to the second computer over a network, wherein the plurality of artifacts are from a corpus of documents;
queuing, at the first computer, the plurality of artifacts in response to the received query;
queuing, at the first computer, the plurality of artifacts in response to the received query;
compressing, at the first computer, the plurality of queued artifacts, wherein compressing the plurality of queued artifacts comprises:
determining, at the first computer, for each of the plurality of queued artifacts, to send one of: an artifact, and only a link to the artifact based on semantic relatedness of queued artifacts to other queued artifacts, the determining resulting in a first set of artifacts to send, and a second set of artifacts to only send links;
wherein determining includes:
clustering the queued artifacts based on semantic similarity;
determining, for each cluster, a threshold based on respective semantic similarity scores of the artifacts;
assigning all artifacts in the cluster scoring above the threshold to the first set of artifacts;
assigning all artifacts in the cluster scoring below the threshold to the second set of artifacts; and
transmitting, by the first computer, the first set of artifacts and links to the second set of artifacts over the network to the second computer.

13. The cloud transfer service system of claim 12, wherein the one or more network decision variables include one or more of: phrase index algorithm, cluster optimization, network analysis, geographic information system coordinate based tiling, geographic information system place name index, geographic information system shape file optimization, relationship driven optimization, automated National Image Transmission Format chipping, key length value video correlation, and query based machine learning optimization.

14. The cloud transfer service system of claim 12, wherein the one or more network decision variables are based on one or more of: relationships between textual elements in an artifact, and relationships between artifacts.

15. The cloud transfer service system of claim 12, wherein the relationships comprise semantic connections between two entities.

16. The cloud transfer service system of claim 12, further comprising:
ranking the queued artifacts by a semantic similarity score, wherein the semantic similarity score determines a strength of a relationship between artifacts; and
prioritizing transmission based on the semantic similarity score.

17. The cloud transfer service system of claim 12, wherein sending further comprises:
identifying an artifact of the plurality of artifacts that comprises an image; and
sending a segment of the image determined to be of relevance to the query.

18. The cloud transfer service system of claim 12, wherein sending further comprises:
identifying an artifact that comprises a video image; and
sending one or more frames of the video image determined to be of relevance to the query.

19. The cloud transfer service system of claim 12, wherein sending further comprises:
monitoring the hyperlink by a machine learning system to determine whether users open the hyperlink to the artifact; and
when the hyperlink is opened by a majority of the users to access the artifact, replacing the hyperlink with the artifact in a subsequent transmission.

20. The cloud transfer service system of claim 19, wherein a user requests transmission of the corresponding artifact for the hyperlink in a subsequent transmission.

21. The cloud transfer service system of claim 12, wherein the link comprises a hyperlink.

22. The cloud transfer service system of claim 12, wherein each link is sent with a statement for which known fact the artifact supports.

* * * * *